(12) United States Patent
Kolodziej

(10) Patent No.: US 11,611,423 B2
(45) Date of Patent: Mar. 21, 2023

(54) METHODS AND SYSTEMS FOR SIGNAL INTERFERENCE CANCELLATION

(71) Applicant: Massachusetts Institute of Technology, Cambridge, MA (US)

(72) Inventor: Kenneth E. Kolodziej, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 201 days.

(21) Appl. No.: 17/186,894

(22) Filed: Feb. 26, 2021

(65) Prior Publication Data

US 2022/0094512 A1 Mar. 24, 2022

Related U.S. Application Data

(60) Provisional application No. 63/019,694, filed on May 4, 2020.

(51) Int. Cl.
*H04L 5/14* (2006.01)
*H04B 1/10* (2006.01)

(52) U.S. Cl.
CPC ............ *H04L 5/14* (2013.01); *H04B 1/1081* (2013.01)

(58) Field of Classification Search
CPC ............................. H04L 12/28; H04L 12/50
USPC ....................................................... 370/329
See application file for complete search history.

(56) References Cited

U.S. PATENT DOCUMENTS

| | | |
|---|---|---|
| 7,155,179 B1 | 12/2006 | Rothenberg |
| 7,783,266 B2 | 8/2010 | Hosokawa et al. |
| 9,203,455 B2 | 12/2015 | Yang et al. |
| 9,859,992 B1 | 1/2018 | Hogerheiden |
| 9,887,862 B2 | 2/2018 | Zhou et al. |
| 9,900,019 B1 | 2/2018 | Chang |
| 9,909,904 B2 | 3/2018 | Geiger |
| 10,110,306 B2 | 10/2018 | Jain et al. |
| 10,243,718 B2 | 3/2019 | Hong et al. |
| 10,256,864 B2 | 4/2019 | Eltawil et al. |
| 10,374,656 B2 | 8/2019 | Cox et al. |

(Continued)

FOREIGN PATENT DOCUMENTS

WO WO 2018/218089 A1 11/2018

OTHER PUBLICATIONS

Non-Final Office Action dated Apr. 22, 2022, for U.S. Appl. No. 17/109,634; 11 Pages.

(Continued)

*Primary Examiner* — Dang T Ton
(74) *Attorney, Agent, or Firm* — Daly, Crowley, Mofford & Durkee, LLP

(57) ABSTRACT

A system for canceling signal interference (SI) includes a transceiver configured to concurrently transmit signals and receive signals within a single frequency band, which causes signal interference between the transmitted and received signals. The SI canceller is configured to use a set of cancellation coefficients to generate a cancellation signal to mitigate the SI. The system is configured to iteratively change the cancellation coefficients by a step factor to produce tuned cancellation coefficients. The step factor is determined by a cancellation error gradient and one or more of: a tunable coefficient step aggressiveness factor; and a time-based forgetting factor; and cause the SI canceller to cancel the SI using the tuned cancellation coefficients.

21 Claims, 8 Drawing Sheets

(56) References Cited

U.S. PATENT DOCUMENTS

| | | | |
|---|---|---|---|
| 10,601,456 | B2 | 3/2020 | Tsui et al. |
| 11,165,463 | B1 | 11/2021 | Williams |
| 11,245,430 | B1 * | 2/2022 | Huang ............... H04B 1/0475 |
| 2007/0173209 | A1 | 7/2007 | Kim et al. |
| 2007/0237270 | A1 | 10/2007 | Mezer et al. |
| 2017/0214429 | A1 | 7/2017 | Eistein et al. |
| 2018/0278290 | A1 | 9/2018 | Moorti et al. |
| 2019/0173503 | A1 | 6/2019 | Kolodziej et al. |
| 2019/0253922 | A1 | 8/2019 | Jain et al. |
| 2020/0043461 | A1 | 2/2020 | Zollner et al. |

OTHER PUBLICATIONS

PCT International Search Report and Written Opinion dated May 21, 2021 for International Application No. PCT/US2021/019918; 13 Pages.

Non Final Office Action dated Mar. 24, 2022, U.S. Appl. No. 17/185,142, 28 pages.

U.S. Final Office Action dated Sep. 29, 2022 for U.S. Appl. No. 17/185,142; 21 pages.

U.S. Appl. No. 17/185,142, filed Feb. 25, 2021, Yi et al.

PCT Notification of Transmittal of the International Search Report and the Written Opinion of the International Searching Authority, International Search Report and Written Opinion, dated Feb. 19, 2021, for International Application No. PCT/US2020/62823; 10 Pages.

Bai, et al.; "Full-Duplex in 5G Small Cell Access: System Design and Performance Aspects"; Mar. 23, 2019; 7 Pages.

Bakshi, et al.; "Fast and Efficient Cross Band Channel Prediction Using Machine Learning"; 25th Annual International Conference on Mobile Computing and Networking; Article No. 37; Oct. 2019; 16 Pages.

Balachandran, et al.; "Flexible Duplex in FDD Spectrum"; ICC 2017: WS07-Workshop on Flexible Networks (FlexNets); Jan. 2017; 6 Pages.

Beach, et al.; "Flexible Duplex Transceivers for 5G and Beyond Wireless Access"; URSI AT-RASC 2015 Conference; Jan. 2015; 1 Page.

Bharadia, et al.; "Full Duplex Radios"; SIGCOMM'13; Jan. 2013; 12 Pages.

Cummings, et al.; "Neural Networks for Real-Time Adaptive Beamforming in Simultaneous Transmit and Receive Digital Phased Arrays"; Jan. 2019; 8 Pages.

Guo, et al.; "DSIC: Deep Learning based Self-Interference Cancellation for In-Band Full Duplex Wireless"; Jan. 2019; 6 Pages.

Guo, et al.; "Realtime Software Defined Self-Interference Cancelation Based on Machine Learning for In-Band Full Duplex Wireless Communication"; 2018 International Conference on Computing, Networking and Communications (ICNC): Mobile Computing and Vehicle Communications; pp. 779-783; Jan. 2018; 5 Pages.

Hagan, et al.; "Training Feedforward Networks with the Marquardt Algorithm"; IEE Transactions on Neural Networks; vol. 5; No. 6; pp. 989-993; Nov. 1994; 5 Pages.

Huusari, et al.: "Wideband Self-Adaptive RF Cancellation Circuit for Full-Duplex Radio: Operating Principle and Measurements"; Jan. 2015; 7 Pages.

Jain, et al.; "Practical, Real-time, Full Duplex Wireless"; Proceedings of the 17th Annual International Conference on Mobile Computing and Networking, MOBICOM 2011; Sep. 19-23, 2011; 12 Pages.

Kim, et al.; "Demo: A Reinforcement Learning-based Flexible Duplex System for B5G with Sub-6 GHz"; Jan. 2020; 2 Pages.

Kolodziej, et al.; "Adaptive Learning Rate Turning Algorithm for RF self-Interference Cancellation"; IEEE Transactions on Microwave Theory and Techniques; Jan. 2020; 12 Pages.

Kolodziej, et al.; "In-Band Full-Duplex Technology: Techniques and Systems Survey"; IEEE Transactions on Microwave Theory and Techniques; vol. 67; No. 7; pp. 3025-3041; Jul. 2019; 17 Pages.

Kolodziej, et al.; "Machine Learning for Accelerated IBFD Tuning in 5G Flexible Duplex Networks"; 4 Pages ,2020.

Kolodziej, et al.; "Multitap RF Canceller for In-Band Full-Duplex Wireless Communication"; IEEE Transactions on Wireless Communications; vol. 15; No. 6; pp. 4321-4334; Jun. 2016; 14 Pages.

Kolodziej, et al.; "Photonic-Enabled RF Canceller for Wideband In-Band Full Duplex Wireless Systems"; IEEE Transactions on Microwave Theory and Techniques; vol. 67; No. 5; May 2019; 11 Pages.

Kolodziej, et al.; "Wideband Vector Modulator for RF Cancellers in STAR Systems"; RWS 2018; pp. 64-67; Jan. 2018; 4 Pages.

Kurzo, et al.; "Design and Implementation of a Neural Network Aided Self-Interference Cancellation Scheme for Full-Duplex Radios"; Asilomar 2018; pp. 589-593; Jan. 2018; 5 Pages.

Kurzo, et al.; "Hardware Implementation of Neural Self-Interference Cancellation"; IEEE Journal on Emerging and Selected Topics in Circuits and Systems; vol. 10; No. 2; p. 204-216; Jun. 2020; 13 Pages.

Levenberg; "A Method for the Solution of Certain Non-Linear Problems in Least Squares"; vol. II; No. 2; pp. 164-168; Feb. 21, 1944; 5 Pages.

Liao; "Dynamic Uplink/Downlink Resource Management in Flexible Duplex-Enabled Wireless Networks"; ICC2017: WT02-3rd International Workshop on 5G RAN Design; Jan. 2017; 7 Pages.

Liu; "On the Levenberg-Marquardt Training Method for Feed-Forward Neural Networks"; 2010 Sixth International Conference on Natural Computation (ICNC 2010); pp. 456-460; Jan. 2010; 5 Pages.

Liu, et al.; "Performance Evaluation of Flexible Duplex Implement based on Radio Frame Selection in LTE Heterogeneous Network"; 22nd International Conference on Telecommunications (ICT 2015); pp. 308-312; 5 Pages.

Marquardt; "An Algorithm for Least-Squares Estimation of Nonlinear Parameters"; J. Soc. Indust. Appl. Math.; vol. 11; No. 2; Jun. 1963; 11 Pages.

Nagulu, et al.; "Fully-Integrated Non-Magnetic 180nm SOI Circulator with >1W P1dB, >+50dBm IIP3 and High Isolation Across 1.85 VSWR"; 2018 IEEE Radio Frequency Integrated Circuits Symposium; pp. 10-107; Jan. 2018; 4 Pages.

Nagulu, et al.; "Non-Magnetic 60GHz SOI CMOS Circulator Based on Loss/Dispersion-Engineered Switched Bandpass Filters"; ISSCC 2019; Session 28; Techniques for Low-Power & High-Performance Wireless; 28.5; pp. 446-448; 2019 IEEE International Solid-State Circuits Conference; Jan. 2019; 3 Pages.

Ozis, et al.; "Integrated Quadrature Couplers and Their Application in Image-Reject Receivers"; IEEE Journal of Solid-State Circuits; vol. 44; No. 5; May 2009; 13 Pages.

Palaniappan, et al.; "A Spectral Shaper Based Two-Tap RF Self-Interference Canceller for Full-Duplex Radios"; IEEE/MIT-S International Microwave Symposium; pp. 614-617; Jan. 2019; 4 Pages.

Pirinen; "Challenges and Possibilities for Flexible Duplexing in 5G Networks"; Special Session: Duplexing Techniques for 5G Networks; pp. 6-10; Jan. 2015; 5 Pages.

Reiskarimian, et al.; "A CMOS Passive LPTV Nonmagnetic Circulator and its Application in a Full-Duplex Receiver"; IEEE Journal of Solid-State Circuits; vol. 52; No. 5; May 2017; 15 Pages.

Smith, et al.; "Neural Network Training With Levenberg-Marquardt and Adaptable Weight Compression"; IEEE Transactions on Neural Networks and Learning Systems; vol. 30; No. 2; pp. 580-587; Feb. 2019; 8 Pages.

Balatsoukas-Stimming; Non-Linear Digital Self-Interference Cancellation for In-Band Full-Duplex Radios Using Neural Networks; 2018 IEEE 19th International Workshop on Signal Processing Advances in Wireless Communications (SPAWC); Jan. 2018; 5 Pages.

Tamminen, et al.; "Digitally-Controlled RF Self-Interference Canceller for Full-Duplex Radios"; 2016 24th European Signal Processing Conference (EUSIPCO); pp. 783-787; Jan. 2016; 5 Pages.

Wan, et al.; "Evolving LTE with Flexible Duplex"; Globecom 2013 Workshop—Emerging Technologies for LTE-Advanced and Beyond 4G; pp. 49-54; Jan. 2013; 6 Pages.

Wang, et al.; "Performance Comparison of Real and Complex Valued Neural Networks for Digital Self-Interference Cancella-

(56) References Cited

OTHER PUBLICATIONS tion"; 2019 IEEE 19$^{th}$ International Conference on Communication Technology; pp. 1193-1199; Jan. 2019; 7 Pages.

Zhan, et al.; "Full Duplex 2X2 MIMO Radios"; 2014 Sixth International Conference on Wireless Communications and Signal Processing (WCSP); Jan. 2019; 6 Pages.

Zhan, et al.; "Full Duplex Dual-Band Radio Dedicated to Flexible Radio Communications"; Research Report N° 8558; Jul. 2014, 17 Pages.

Response to U.S. Office Action dated Sep. 29, 2022 for U.S. Appl. No. 17/185,142; Response filed on Dec. 23, 2022; 13 pages.

Request for Continued Examination (RCE) for U.S. Appl. No. 17/185,142; filed Dec. 23, 2022; 3 pages.

\* cited by examiner

METHODS AND SYSTEMS FOR SIGNAL INTERFERENCE CANCELLATION

RELATED APPLICATIONS

This patent claims the benefit of U.S. Provisional Patent Application No. 63/019,694 filed May 4, 2020, which is incorporated by reference in its entirety.

FEDERALLY SPONSORED RESEARCH

This invention was made with government support under FA8702-15-D-0001 awarded by the U.S. Air Force. The government has certain rights in the invention.

FIELD

This disclosure relates to cancellation of signal interference between electronic or electromagnetic signals.

BACKGROUND

Time division and frequency division multiplexing and duplexing are different architecture types that can be used for signal transmission and reception. For example, current fifth generation (5G) new radio (NR) and sixth generation (6G) wireless systems require the use of both frequency-division duplex (FDD) and time-division duplex (TDD) modes, as well as flexible duplexing. The latter concept was initiated to evolve fourth generation (4G) Long-Term Evolution (LTE) systems by merging aspects of FDD and TDD to enhance network efficiency. This, however, can result in closely spaced frequency channels being assigned to concurrently occurring transmit and receive operations, which generates system-level interference. This interference has previously been managed through power control algorithms and device muting.

In-Band Full-Duplex (IBFD) systems operate in full-duplex mode, where a signal is transmitted and received on the same frequency at the same time. This scheme requires a high amount of isolation between a co-located transmitter and receiver in order to avoid self-interference (SI). SI occurs as a result of a system transmit signal leaking or otherwise being received in a receive signal path (e.g. a receive channel) of the same system. Reducing, and ideally minimizing, the amount of transmit signal power coupled into a receive signal path helps avoid saturating a receiver and allows the reception of low power (or weak) signals from physically remote from the receiver users. Self-interference is typically reduced (and ideally minimized) by using multiple layers of cancellation, one of which is adaptive RF cancellation. In current applications such as 5G, signal interference must be sufficiently suppressed quickly and in real-time. Although cancellers have been shown to successfully mitigate SI in other systems, current RF cancellers lack the tuning speed required for such applications.

To solve this issue, some cancellers utilize special channel-probing waveforms and receive signal strength indicator information (RSSI) for tuning. Others employ dithered linear search (DLS) approaches and least mean squares (LMS) algorithms. While these RF cancellers provided sufficient cancellation performance, they are not able to converge to their optimal settings in an efficient manner, which causes errors and inefficiencies in the transmission and reception for these systems.

SUMMARY

In embodiments, the tuning time and cancellation effectiveness of a Signal Interference (SI) canceller can be improved by using an effectiveness (or error) gradient, a tunable aggressiveness factor, and a forgetting factor to generate coefficients for the SI canceler.

In an embodiment, a method for canceling signal interference by a signal interference includes: selecting an initial set of cancellation coefficients; applying the initial set of cancellation coefficients to the SI canceller; canceling signal interference with the SI canceller having the applied initial set of cancellation coefficients; and measuring a cancellation error resulting from the initial cancellation coefficients. The cancellation error defines a direction for tuning the cancellation coefficients to achieve a relative minimum cancellation error. The initial set of cancellation coefficients are changed by a step factor to produce a first set of tuned cancellation coefficients. The step factor is determined by a combination of the cancellation error and one or more of: the measured cancellation error scaled by a tunable coefficient step aggressiveness factor; and the measured cancellation error scaled by a time-based forgetting factor. The first set of tuned cancellation coefficients are applied to the canceller, and the SI canceller uses the tuned coefficients to cancel SI.

One or more of the following features may be included.

A second cancellation error resulting from the first set of tuned cancellation coefficients may be measured. The first set of cancellation coefficients may be changed by a second step factor to produce a second set of tuned cancellation coefficients. The second step factor is based on: the second measured cancellation error; a tunable coefficient step aggressiveness factor; and a time-based forgetting factor. The second set of tuned cancellation coefficients is applied to the SI canceller, which uses the second set of tuned coefficients to cancel signal interference.

The method may iteratively repeat generating cancellation coefficients to progressively tune the cancellation coefficients and improve cancellation effectiveness.

The step factor is determined by a direction of the measured cancellation error.

The SI canceller may be an analog SI canceller.

The signal interference may be caused by a transceiver configured to concurrently transmit and receive signals within a single frequency band.

The transceiver may be a fifth generation (5G) or sixth generation (6G) wireless transceiver.

The SI canceller may have a plurality of taps and the set of cancellation coefficients may contain one or more subsets of cancellation coefficients for respective ones of the plurality of taps.

The aggressiveness factor may define a size of the step factor.

The time-based forgetting factor may function to progressively reduce a size of the step factor based on a number of tuning iterations.

In another embodiment, a system for canceling signal interference includes a transceiver configured to concurrently transmit signals and receive signals within a single frequency band resulting in signal interference. An SI canceller is configured to use a set of cancellation coefficients to generate a cancellation signal to mitigate the SI between the transmitted signals and the received signals. The cancellation coefficients are configured to (at least) partially define the cancellation signal. A processor is configured to change the cancellation coefficients by a step factor to produce tuned cancellation coefficients. The step factor is determined by a cancellation error and one or more of: the cancellation error scaled by a tunable coefficient step aggressiveness factor; and the cancellation error scaled by a time-based forgetting factor. The processor is also configured to cause the SI canceller to cancel the SI using the tuned cancellation coefficients.

One or more of the following features may be included. The processor may be further configured to progressively tune the cancellation coefficients to further improve cancellation effectiveness.

A cancellation error module may be coupled to receive the transmitted signals and use the transmitted and received signals to generate the cancellation error.

A direction of the step factor may be determined by a direction of the cancellation error.

The SI canceller may be an analog SI canceller.

The transceiver may be an in-band full-duplex transceiver.

The transceiver may be a fifth generation (5G) or sixth generation (6G) wireless transceiver.

The aggressiveness factor may define a size of the step factor.

The time-based forgetting factor may progressively reduce a size of the step factor based on a number of tuning iterations.

The SI canceller may a multi-tap canceller and the cancellation coefficients may include a set of cancellation coefficients for each tap of the canceller.

In another embodiment, a system for canceling signal interference includes a transceiver configured to concurrently transmit signals and receive signals within a single frequency band resulting in signal interference (SI). An SI canceller is configured to use a set of cancellation coefficients to generate a cancellation signal to mitigate the SI between the transmitted signals and the received signals. The cancellation coefficients are configured to (at least) partially define the cancellation signal. The system includes means for progressively tuning the cancellation coefficients to produce tuned cancellation coefficients and applying the tuned cancellation coefficients to the SI canceller to allow the SI canceller to use the tuned cancellation coefficients to mitigate the SI and improve cancellation effectiveness.

BRIEF DESCRIPTION OF THE DRAWINGS

The features described here may be more fully understood from the following drawings. The drawings aid in explaining and understanding the disclosed technology. Since it is often impractical or impossible to illustrate and describe every possible embodiment, the provided figures depict one or more exemplary embodiments. Similarly, any flow diagrams are provided as examples only and may be changed, reordered, reduced, expanded, etc. and remain within the scope of this disclosure. Accordingly, the figures are not intended to limit the scope of the invention. Like numbers in the figures denote like elements.

DETAILED DESCRIPTION

Figure 1:
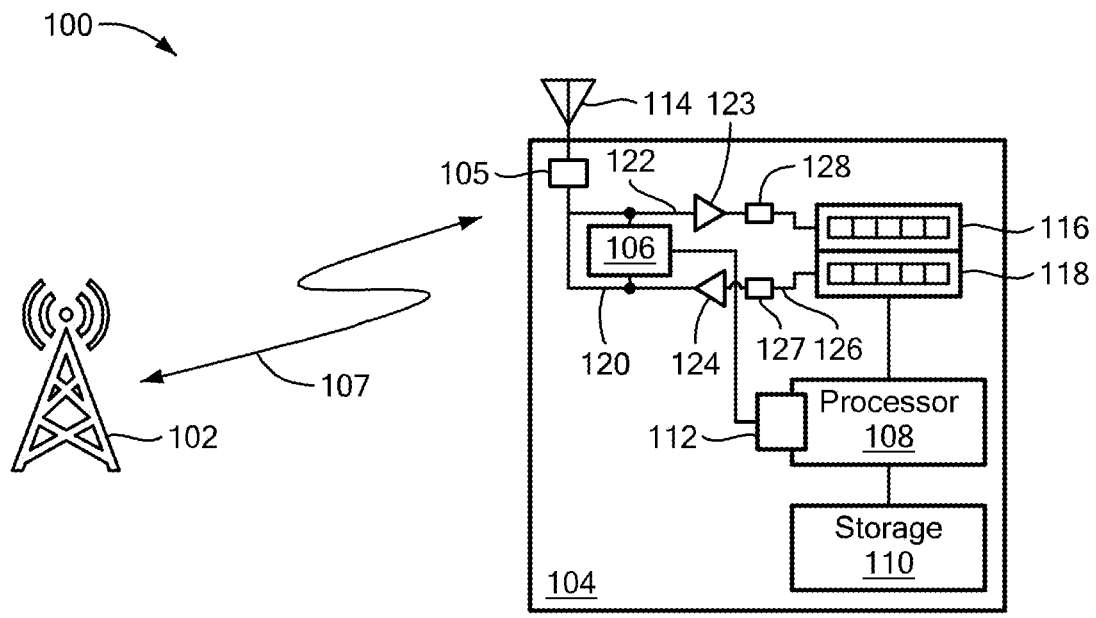
FIG. 1 is a block diagram of a transmission network including a Signal Interference (SI) canceller.

Referring to FIG. 1, an example network 100 includes a base station 102 and mobile device 104 in communication through a wireless link 107. Network 100 may be an in-band full-duplex (IBFD), also known as a same-frequency simultaneous transmit and receive (STAR) system, where base station 102 and/or mobile device 104 each transmit and receive signals data or messages at the same frequency and/or same frequency band at the same time. For example, messages sent by base station 102 may be sent in the same frequency band at the same time as messages received by the base station 102. Likewise, messages sent by the mobile device 104 may be sent in the same frequency band at the same time as messages received by the mobile device 104.

Network 100 may be any type of communication network that utilizes in-band full-duplex transmission. Although depicted as a wireless communication network in FIG. 1, network 100 could also be a satellite network, a radar network, a wired network, etc. After reading this patent, one skilled in the art will recognize that the systems and methods described here can be used, or can be adapted to be used, with any type of network including those that employ in-band full-duplex technologies.

In FIG. 1, for ease of illustration, the details of mobile device 104 are shown to illustrate and discuss the technology. However, the systems and methods described in this patent can be included as part of base station 102, of mobile transceivers, or of any device utilizing in-band full-duplex transmission or otherwise subject to signal interference between transmitter and receiver channels. For example, wireless networks have been designed to cover large areas with static access points and symmetric communications that utilized spectrally inefficient frequency division duplexing for channel access. The trend has been towards deploying significantly smaller cells that utilize time-division duplexing to support asymmetric data traffic for user equipment, such as large file downloads and high-definition video streaming applications that are common on mobile devices. The systems and methods described in this patent are suitable for use in any device capable of operating in any such network.

Mobile device 104 may include an antenna system 114 comprising one or more antennas (e.g. a bistatic or monostatic antenna system) for transmission and reception of messages over the wireless link 107. In some embodiments, the antenna system 114 is a single antenna that is used for both transmission and reception of signals.

In this case, mobile device 104 may include a circulator or a transmit-receive (T/R) switch (e.g. a three-port device/circuit 105) which couples the antenna to transmit and receive systems (e.g. a transceiver) of mobile device 104. The circulator may be disposed between the antenna port and the transmitter and receiver ports to direct transmit signals (e.g. signals generated by a transmitter) to the antenna, and direct signals received by the antenna to a receiver. It should be noted that only portions the transmitter and receiver circuitry are explicitly shown in FIG. 1 (such as receiver amplifier 123, receive buffer 116 and transmit amplifier 124, transmit buffer 118, respectively); as will be recognized by those of ordinary skill in the art, a receiver and transmit circuitry may also include one or more of frequency downconverter circuits, frequency upconverter circuits, analog-to-digital converters, digital-to-analog converters as well as other circuitry, all of which have been omitted from the block diagram of FIG. 1 so as to promote clarity in the description of the concepts sought to be protected.

In other embodiments, the antenna system 114 may include two or more antennas (e.g. separate receive and transmit antennas or groups of antennas). In this case, although the system may use separate transmit and receive antennas, the antennas may be located close enough together (e.g. physically located in the same device or on the same antenna tower) so that the receive antenna receives transmissions that are emitted by the transmit antenna (e.g. one source of signal interference.

To reduce errors caused by signal interference (SI), mobile device 104 includes an SI canceller 106. The canceller 106 is disposed to receive (e.g. couple or otherwise receive) portions of transmit signals (e.g. outgoing transmissions) from a transmit signal path 120 and, in response, drive an analog cancellation signal into a receive signal path 122.

It should be appreciated that transmit signal path 120 may comprise circuit 105, buffer 118, digital-to-analog converter (DAC) 127, transmit amplifier 124 and other circuitry not explicitly shown in FIG. 1 for the reasons explained above. Thus, it should be appreciated that transmit signal path 120 may comprise both digital and analog portions (i.e. digital signals propagate in some portions of the transmit signal path 120 and analog signals propagate in some portions of the transmit signal path 120). For example, digital signals propagate in those portions of transmit signal path 120 between buffer 118 and the input of DAC 127 while analog signals propagate in those portions of transmit signal path 120 between the output of DAC 127 and antenna 114.

Similarly, receive signal path 122 may comprise circuit 105, amplifier 123, analog-to-digital converter (ADC) 128, buffer 116, and other circuitry not explicitly shown in FIG. 1 for the reasons explained above. Thus, receive signal path 122 may comprise both digital and analog portions (i.e. analog signals propagate in some portions of the receive signal path 122 and digital signals propagate in some portions of the receive signal path 122). For example, analog signals propagate in those portions of receive signal path 122 from antenna 114 and the input of ADC 128 while digital signals propagate in those portions of receive signal path 122 from the output of ADC 128 to buffer 116.

Also, in systems which include one antenna (such as that shown in FIG. 1), antenna 114 may be considered part of both the transmit and receive signal paths. Circuit 105 may also be considered to part of both the transmit and receive signal paths.

The analog cancellation signal is configured to cancel interference signals (e.g. transmission signals) from the transmit signal path 120 that are coupled into the receive signal path 122, so that the transmission signal is removed and the signal remaining on receiver path 122 is the signal received via antenna 114 from another transmission device such as base station 102.

In the example shown, the SI canceller 106 is coupled to transmit signal path 120 (an in particular to an analog transmission line portion of transmit signal path 120). In other embodiments, the SI canceller 106 may receive a digital transmission signal as input. For example, the SI canceller 106 may be disposed to receive (e.g. coupled or otherwise disposed to receive) the digital transmission signal 126 from the transmission buffer 118, prior to the digital transmission signal 126 being converted to an analog signal by a digital-to-analog converter (DAC) 127 which analog signal is then provided to an input port of a transmit amplifier 124 (which may, for example, be provided as a power amplifier).

Additionally, the SI canceller 106 may be disposed to receive an amplified transmission signal (e.g. canceller 106 can be coupled to a portion of the transmit signal path 120 after the transmit signal is amplified via amplifier 124), which allows the SI canceller 106 to capture and cancel any noise or nonlinear distortions in the signal interference. The output of the SI canceller 106 can be coupled to receive signal path 122 before the signal is fed into a receive path amplifier 123, (which may, for example, be provided as a low noise amplifier) which can help reduce (and ideally, minimize) receiver saturation and nonlinearities.

To generate the cancellation signal, the SI canceller 106 receives a series of coefficients (sometimes referred to as tuning coefficients) from a tuning module 112. These coefficients define or shape the cancellation signal. They may define a phase and magnitude of the cancellation signal that shapes the cancellation signal so that, when mixed with the receiver signal, it cancels the signal interference which may be caused by signals propagating in the transmit signal path 120.

The tuning module 112 may be a circuit or software executed by processor 108 to generate the coefficients. The tuning module 112 may use the signal propagating on the transmit signal path and/or the signal on the receive signal path 120 as inputs to generate the coefficients. In general, the tuning module 112 modifies, generates, or creates coefficients for the analog canceller 106 which, when applied to the analog canceller 106, reduce the signal interference error on the receive signal path 120.

In one example embodiment, the tuning module is software executed by the processor 108. The processor 108 includes a memory and may be coupled to volatile or non-volatile storage 110. The memory and/or storage hold software instructions that cause the processor to effectuate the operation function of tuning module 112. The software instructions may also cause the processor to execute the network functions of mobile device 104 such as sending data to transmission buffer 118 or receiving data from receive buffer 116. In general, the processor 108 may be programmed to perform some or all the functions described in this patent. In embodiments, processor 108 may be a single processor that performs the functions or may comprise multiple processors each programmed to perform one or some of the functions.

Figure 2:
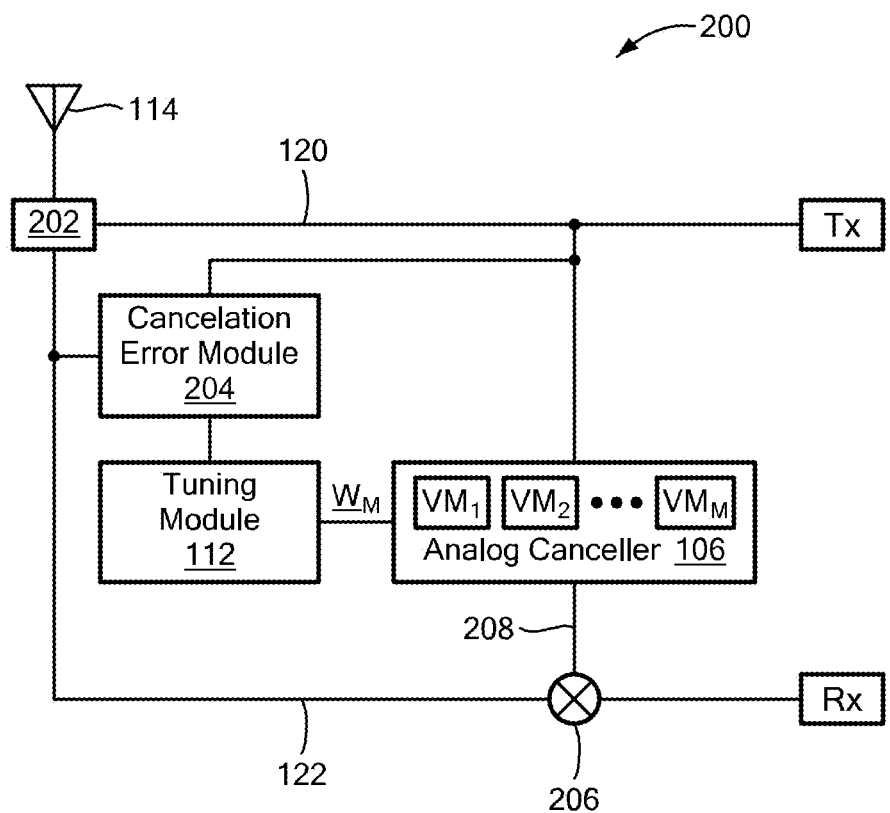
FIG. 2 is a block diagram of a transceiver including an SI canceller.

Referring to FIG. 2, a transceiver circuit 200 like the one shown may be incorporated into base station 102, mobile device 104, or any other device operating in IBFD mode and/or in an IBDF environment. The transceiver circuit 200 includes an antenna system 114 coupled via a transmit signal path 122 (which may comprise an analog transmission line) to a transmitter Tx. Antenna system 114 is also coupled via a receive signal path (e.g. via analog receiver path) 120 as described above. In the case where antenna system 114 is a single antenna, a circulator 202 or other functionally equivalent device may be included to direct signals to/from the antenna to the transmitter Tx and receiver Rx (e.g. to route transmit signals from the transmitter TX to antenna 114 via signal path 120 to and to route receive signals from the antenna to the receiver Rx via receive signal path 122.

The transceiver circuit 200 also includes an SI canceller 106 and a tuning module 112, (described above in conjunction with FIG. 1). The SI canceller 106 may be coupled or otherwise disposed to receive transmission signals from path 122 and generate a cancellation signal 208. Then, the cancellation signal 208 may be added onto the receive signal path 120 by a coupler 206 to cancel the signal interference before the signals are digitized by an analog to digital processor and subsequently processed. In other embodiments, the cancellation signal 208 may be combined and provided to receive signal path 120 by any other signal combination techniques such as mixing, combining, or the like. Similarly, the cancellation signal may be a digital cancellation signal that is used to cancel signal interference on the receiver path 120 after the received signal has been digitized.

The SI canceller 106 may include multiple vector modulator taps $VM_n$ and the tuning module 112 may produce a series of tap vectors $w_n$ that are received by the SI canceller 106. The tap vectors may include data such as weighted coefficients, amplitude, and phase information of the transmit and/or receive signals, and the like that is used by the taps $VM_n$ during signal interference cancellation. Although the taps in this example are vector modulator taps, one skilled in the art will recognize that other types of taps may be used.

The tuning module 112 is coupled to a cancellation error module 204 that measures or otherwise determines a cancellation error on receive signal path 120. The cancellation error is a measurement of how closely the canceller output matches the SI signal and may include a cancellation error vector that describes a direction and amplitude (e.g. a gradient) of a differential error between two or more cancellation measurements. For instance, cancellation error may be understood as the amount of SI that remains in the signal after the SI canceller 106 has operated on the signal and removed as much SI as it can. For example, as the coefficients of the SI canceller 106 change, the cancellation error (i.e. the error in cancellation produced by cancelling the signal interference) may also change. The cancellation error gradient is a vector that contains information about the direction and magnitude of the change in cancellation error produced by the change in cancellation coefficients. This concept will be discussed again below in greater detail.

In some instances, the mobile device 104 may include sensors that can measure the signal on the transmit signal path 122, the signal on the receive signal path 120, or both to generate a cancellation error gradient. For example, cellular phones, base stations, and/or other devices configured to communicate over the wireless link 107 may have sensors or fixtures to measure the quality of messages that are transmitted and received over the network In embodiments, the quality may be defined as an error vector magnitude and/or bit error rate, which can be measured by the mobile device 104 (or other devices) during transmission and reception (where a message having a bit error rate lower than another message is considered to be of higher quality). Additionally or alternatively, devices communication on network 100 may be fixtured to directly measure a signal integrity or cancellation error and/or generate a cancellation error gradient.

Such sensors and measurement fixtures may produce other measurements that can be used to generate an SI cancellation error gradient. Those other measurements include, but not limited to: a magnitude of the SI, a phase of the SI, a real portion of the SI, an imaginary portion of the SI, a quadrature signal of the SI, a bandwidth of the SI, an error vector of the SI, an average of a signal measurement of the SI over a specific bandwidth of the SI, or a combination thereof.

In other embodiments, the measurements may include information about the transmission signal itself as provided on transmit signal path 122. Such information may include, but is not limited to one or more of: a phase of the signal, a real portion of the signal, an imaginary portion of the signal, a frequency of the signal, a magnitude of the signal, an average measurement of the signal, transmit output power, signal bandwidth, frequency channel allocation and/or hopping list, receive signal strength indicator, receiver automatic gain setting or attenuation, receiver mask profile, adjacent channel power level, desired receiver sensitivity, and the like.

Figure 3:
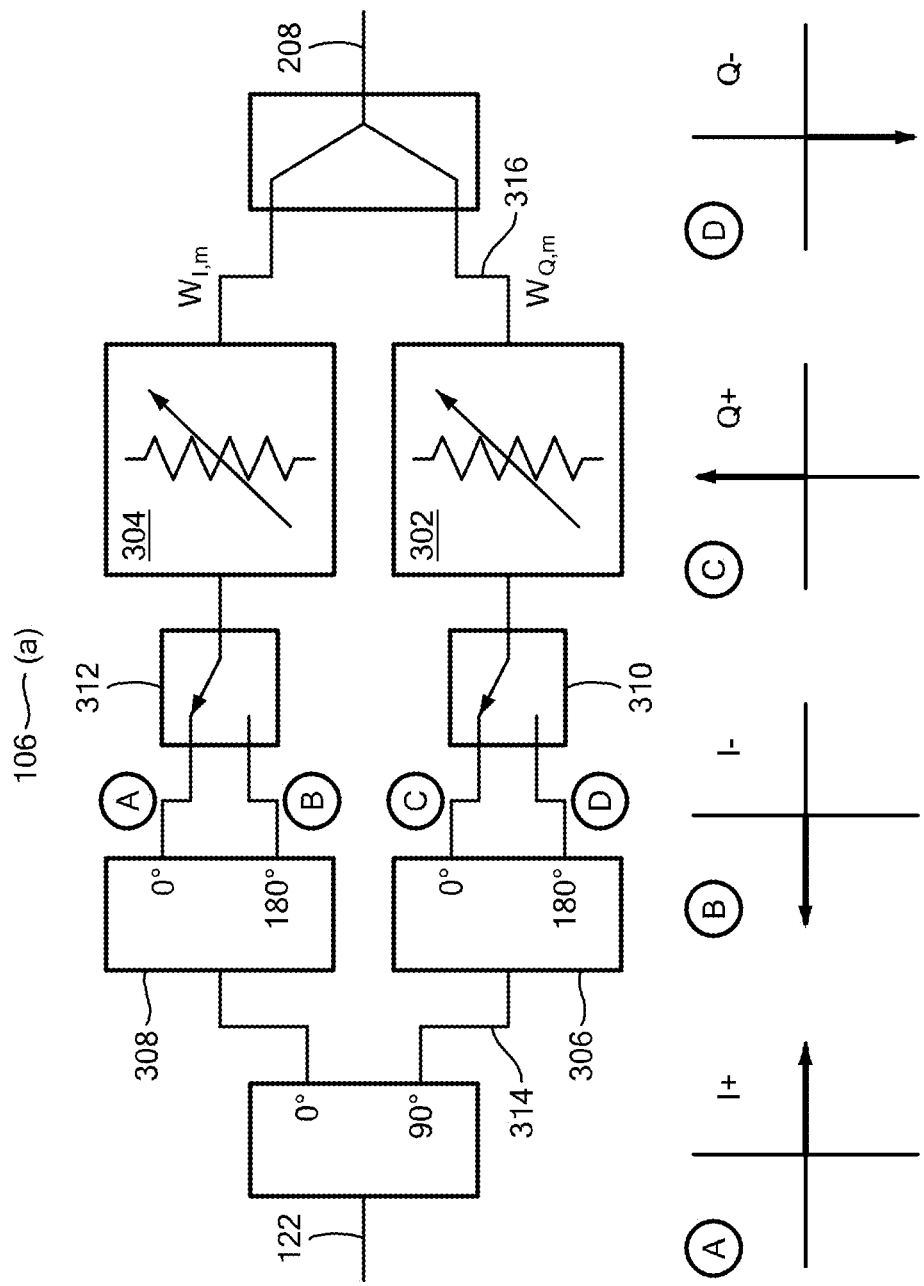
FIG. 3 is a block diagram of an SI canceller.

FIG. 3 is a block diagram of an embodiment of the SI canceller 106. In this example, the SI canceller 106 has two vector modulator (VM) taps to mitigate SI. The two taps may be directed to different aspects of the signal interferences. For example, the SI may include both direct path SI as well as dynamic SI that is dependent on the surroundings and has a composite impulse response. Thus, one tap may be configured to mitigate the direct path SI while the other is configured to mitigate the multipath, dynamic SI.

Since the SI can contain delays that are dependent on both the antenna and surrounding environment, the SI canceller 106 may be configured to provide similar delays to counteract these signals. This is accomplished, for example, using multiple canceller taps that internally delay the transmit signal for the various SI paths. Furthermore, these taps can dynamically change their attenuation and phase to compensate for the unknown SI response characteristics that are specific to a location.

Each tap may include an attenuator circuit 302, 304 responsive to weight coefficients $W_{I,m}$ and $W_{Q,m}$ which, as noted above, may be generated by the tuning module 112. Each tap may also include a delay circuit. The delay circuits have been omitted from FIG. 3 for clarity. However, the delay circuits may be fixed delay circuits or tunable delay circuits that are responsive to delay coefficients generated by the tuning module 112, as described above. In embodiments, the delay circuits may be coupled (for example in series) at the input 314 and/or output 316 of one or more of the canceller taps.

In this example, each tap may also include a phase shifter phase or inverter circuit 306, 308 and a switch 310, 312 to create four vectors I+, I−, Q+, Q−. The switches 310, 312 may select either the positive or the negative vector for both the in-phase (I) and quadrature (Q) channels before they are attenuated by the attenuator circuits 302, 304. The combination of this vector selection and weighting allows the VM to generate arbitrary attenuation and phase changes of the input signal based on the coefficient vectors w provided by the tuning module 112. In other embodiments, other circuits may be used in addition to or in place the phase shifters and/or inverters. For example, a circuit that individually weights the four outputs of the 180-degree hybrids, and then combines them using a 4-way combiner, could be used. Those of ordinary skill will appreciate other techniques and/or circuits may also be used.

In embodiments, the canceller may produce an SI signal that can be defined by the following complex impulse response as a function of time $h_c(t)$ of the SI canceller 106:

$$h_c(t) = \sum_{m=1}^{M} \beta_m (w_{I,m} + jw_{Q,m}) \delta(t - \tau_m) \tag{1}$$

in which:

m is an integer corresponding to a canceller tap;

M is the total number of canceller taps;

$w_I$ and $w_Q$ are cancellation coefficients that define attenuation of the cancellation signal;

t is time; and

τ is a cancellation coefficient defining time delay for each canceller tap m.

In this example, coefficients $w_I$, $w_Q$, and τ may be generated by the tuning module 112 and provided to the analog canceller 106 for use in cancelling the signal interference. In this example, the attenuation coefficients $w_I$ and $w_Q$ may be generated with values between −1 and 1. However, the specific values of any or all generated coefficients may be dependent on the canceller architecture.

Analog Canceller Tuning

When a change is detected by the receiver (typically when a characteristic of the signal integrity crosses a given threshold (e.g., rises above or falls below a given threshold depending upon the particular implementation), the analog canceller must adapt the weights for each tap to compensate and suppress the signal interference. In the example shown in FIG. 3, this process may involve finding the optimal weights $W_I$ and $W_Q$ for each tap, i.e. the weights that correspond to performance that exceeds a minimum performance threshold or to a cancellation error that is less than a maximum error threshold. It may also involve finding the correct phase delay coefficient τ (i.e. the phase delay coefficient τ which results in performance that exceeds a minimum performance threshold). Additionally, there may be other coefficients used during operation of the SI canceller 106. It is noted that while there is typically one global optimum location, there are often several other weight combinations that provide acceptable performance for a particular application, which is one of the reasons to have the target error term in the tuning equation.

Additionally, or alternatively, the analog canceller 106 may have a different hardware architecture than the example architecture shown in FIG. 3. In this case, the analog canceller 106 may use different coefficients, more coefficients, fewer coefficients, etc. In a general aspect, the coefficients produced by tuning module 112 may be represented by a coefficient vector where each coefficient defines a dimension in the coefficient space. For ease of illustration and explanation, this document may refer to the set of canceller coefficients as a coefficient vector.

A challenge of tuning any adaptive analog canceller is that the magnitude and phase of the signal interference varies over time. Multi-tap cancellers, for example, contain multiple parameters that may be simultaneously adapted to precise levels to achieve optimal cancellation performance.

For these reasons, the SI canceller 106 may utilize a gradient-descent scheme to tune the canceller weights W according to, for example:

$$w_{n+1} = w_n - \mu \cdot \nabla E(w) \quad (2)$$

in which:

n is the tuning iteration number;

$w_n$ is the weight of tap n

μ represents the learning rate or step size;

E(w) is the cancellation error; and

∇E(w) is the gradient of the cancellation error (also referred to as cancellation error gradient).

The cancellation error gradient may be a function of the tap weights (e.g. the cancellation coefficients) and may estimate the cancellation error surface or curve.

The step factor μ may be a function of an aggressiveness factor that depends on the measured error and a time- or iteration-based forgetting factor that reduces the dependance of the step on the measured error gradient over time. The step factor (e.g. step size) μ will be discussed further below.

Figure 4:
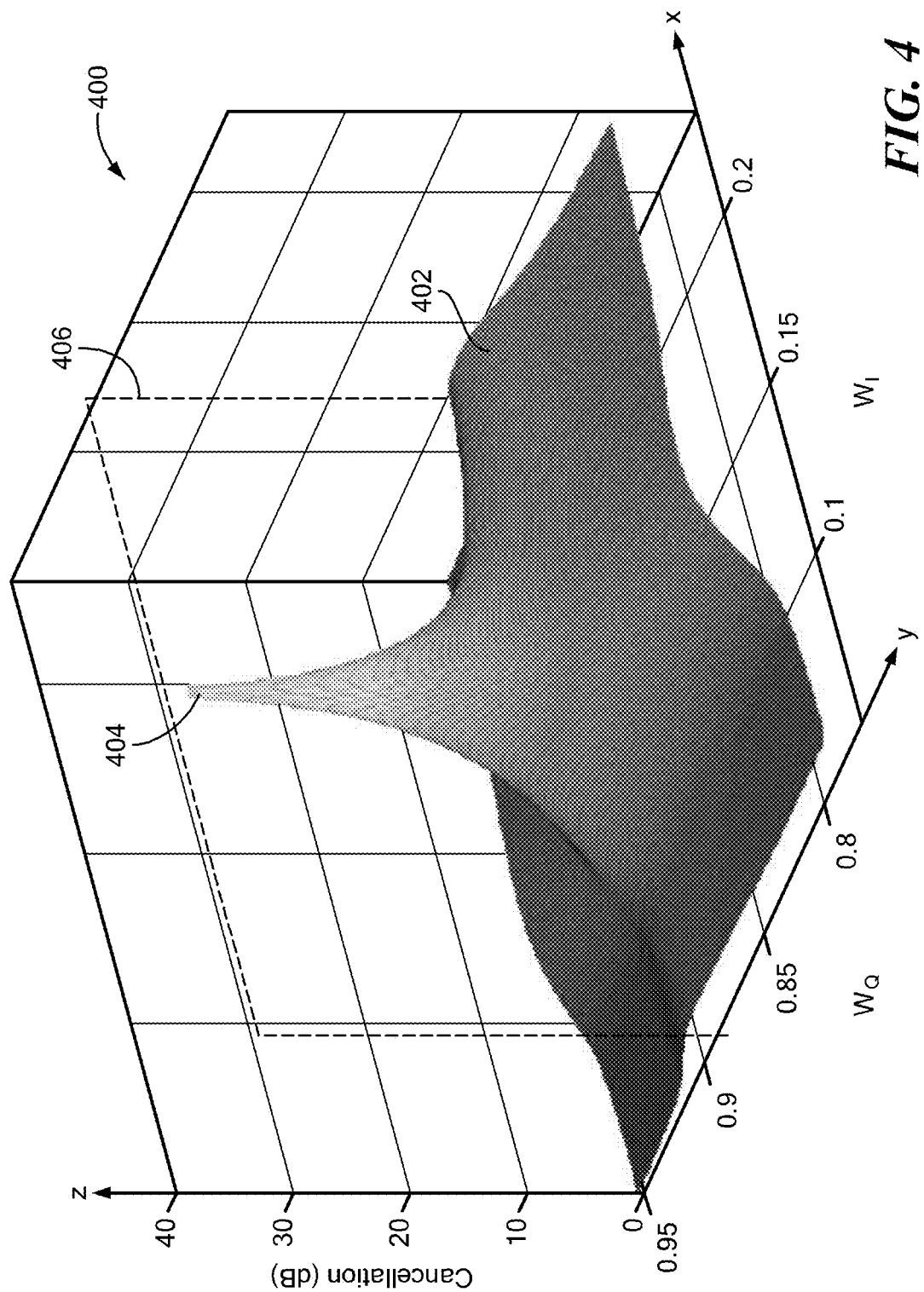
FIG. 4 is a multi-dimensional graph of SI canceller effectiveness versus cancellation coefficients.

Referring to FIG. 4, graph 400 shows a multi-dimensional cancellation surface that defines cancellation effectiveness for various canceller coefficients. In the graph 400, the z axis corresponds to cancellation (i.e. amount of cancellation) which represents the cancellation effectiveness in decibels, the x axis represents values for a canceller coefficient $W_Q$ valves and the y axis corresponds to values for a canceller coefficient valves $W_I$. (e.g. for an SI canceller which may be the same as or similar to the SI canceller in FIG. 3). One skilled in the art will recognize that the numbers and scales on the axes are examples only and that real-world coefficient values and cancellation effectiveness will vary.

The multi-dimensional surface 402 represents cancellation effectiveness for various cancellation coefficient values. In this example, there is a relative maximum cancellation effectiveness at point 404. A surface that represents cancellation error, however, may be inversely proportional to the cancellation effectiveness surface 402 since cancellation error tends to be reduced or even minimized when cancellation is operating effectively. Thus, in this example, the minimum cancellation error may occur at point 404, where the cancellation effectiveness is maximum.

A cancellation error surface, which again may be inversely proportional to the cancellation effectiveness surface 402, can be non-convex and present nearly flat gradients, local minima, and precise optimal locations. Surfaces with such characteristics can be demanding on adaptive tuning algorithms, potentially limiting their performance, and effectively increasing their tuning time. However, the tuning system and techniques described herein provide improved performance relative to prior art and systems and techniques. Such improved performance is due, at least in part, to a combination of the measured error scaled by the aggressiveness factor as well as the gradient magnitude scaled by the forgetting factor.

The graph 500 is a two-dimensional graph of a system with signal interference cancellation. In this example, there are various variables held constant for ease of illustration and explanation. In a real-world system, there may be multiple taps and/or more than two variable coefficients per tap that will create a multi-dimensional cancellation effectiveness surface (or cancellation error surface).

Figure 5:
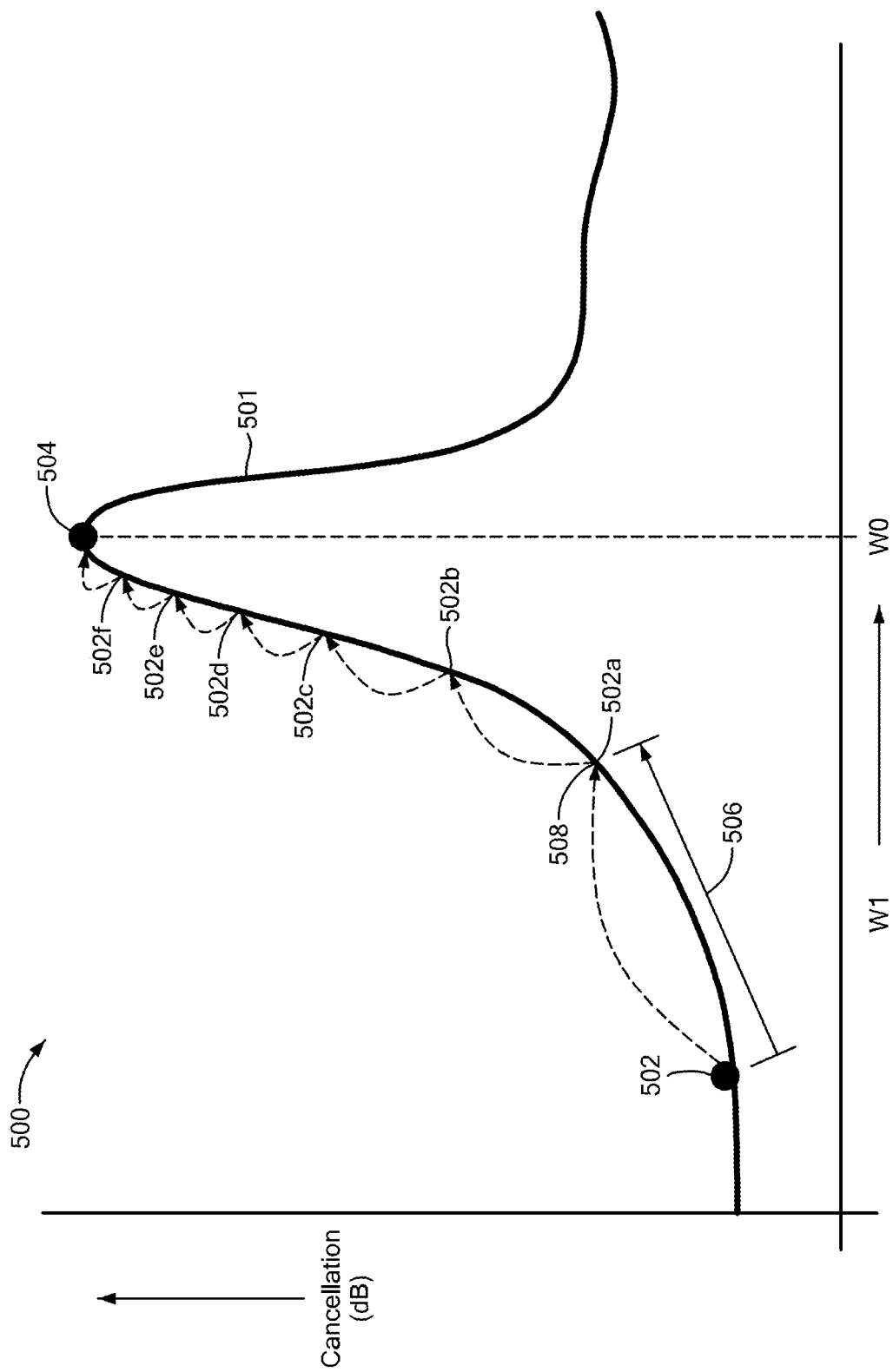
FIG. 5 is a graph of SI cancellation versus a canceller coefficient.

Referring also to FIG. 5, graph 500 is a two-dimensional slice parallel to the y axis of multi-dimensional surface 402, taken at plane 406. Thus, for ease of discussion, the graph 500 has only one independent variable $w_I$ (i.e. constant value of Wq). Similar to graph 400, the Z-axis of graph 500 represents cancellation effectiveness and the X-axis represents values of the cancellation coefficient $w_I$. However, the concepts discussed are applicable and adaptable to multi-variable error curves.

As shown in graph 500, the cancellation effectiveness may have a maximum value at point 504, which for the given value of Wq may correspond to a cancellation coefficient value of $w_0$. When the SI canceller 106 begins operation, the system may not know where the maximum cancellation value (i.e. point 504) lies along the cancellation effectiveness curve 501, so SI Canceller may choose a starting position (e.g. starting value) at point 502. In embodiments, when the starting position may be a predetermined value that is set prior to the canceller starting operation. The predetermined starting position can be set, for example, by a manufacturing process, by a calibration process, etc. The starting position may be random or may be based on previous performance of the SI canceller. For example, in embodiments the SI canceller may use a starting position that was effective in previous cancellation operations or in similar operating environments. In embodiments, the canceller can start up in some random state so the user has to provide an initial set of weights that can be used as the starting position.

To measure a vector that approximates the surface of the cancellation effectiveness curve 501, the system may make two measurements along curve 501. For example, to generate vector 506, the system may make a measurement of cancellation effectiveness at point 502, then change the value of the cancellation coefficient $w_I$ and make a second measurement of cancellation effectiveness at point 508. Once the two measurements are made, the system can generate a differential cancellation effectiveness vector 506 that approximates the cancellation effectiveness curve 501 between points 502 and 508.

The system may then adjust the value of the cancellation coefficient $w_I$ by a step size (i.e. a step value) according to a modified gradient ascent algorithm so that system performance approaches the point of maximum cancellation effectiveness value (i.e. point 504). The system may continue to iteratively measure cancellation and adjust the cancellation coefficient $w_I$ until the system reaches point 504 and/or reaches a minimum cancellation effectiveness threshold.

In one embodiment, a step size $\mu$ for adjusting a cancellation coefficient $w_I$ may be determined in accordance with Equation (3) below. It is noted that in Equation (3) the step size $\mu$ is determined as a function of canceller weights w and aggressiveness factor $EF_T$:

$$\mu_n(w, EF_T) = \frac{EF(w)}{EF_T} + \frac{1}{n(|\nabla EF(w)|^2)} \quad (3)$$

in which:
$\mu$ is the step size, n is a tuning iteration number,
w represents a canceller weight,
$EF_T$ is an aggressiveness factor representing the target effectiveness value,
EF(w) is the cancellation effectiveness vector as a function of canceller weight w, and
$\nabla EF(w)$ is the cancellation effectiveness gradient as a function of canceller weight w.
T is a subscript for identification purposes.

The factor $EF_T$, which affects the first term of equation (3) may be considered an aggressiveness factor that defines how aggressively the system should approach the point of maximum cancellation effectiveness value (i.e. point 504). The value $EF_T$ may be set or tuned to reduce the number of iterations needed to achieve acceptable cancellation effectiveness. The value may be set prior to operation, during manufacturing, or may be tunable during operation. The first term of equation (3) is also based on the effectiveness vector itself so that, as the cancellation effectiveness of the system approaches a target effectiveness (e.g. point 504), the step size $\mu$ is iteratively reduced. Of significance with respect to the first term, is that the overall step size is influenced by the measured error (EF(w)) that is scaled by the aggressiveness factor.

The second term of equation (3) includes the inverse of the gradient magnitude which is scaled by the forgetting factor n. In this example, n is the number of tuning iterations.

When the gradient is small, the step size $\mu$ will be relatively large and, when the gradient is large, the step size $\mu$ will be relatively small. Thus, when the canceller weights w are on a flat portion of the cancellation effectiveness curve (i.e. when the gradient is small), the step factor $\mu$ will be relatively large so that the canceller weights change by a large step size to seek a global maximum. Conversely, when the canceller weights are on a sloped portion of the cancellation effectiveness curve (i.e. the gradient is large), the step factor $\mu$ will be relatively small so that the canceller weights can approach the global maximum without overstepping it. The forgetting factor further reduces the step size by scaling the gradient by the number of iterations n. Thus, as the number of iterations increases, the second term of equation (3) will iteratively be relatively reduced in magnitude so that, as the cancellation effectiveness of the system approaches a target effectiveness (e.g. point 504), the step size $\mu$ is also relatively reduced as can be seen in FIG. 5 by looking at points 502a-502f.

FIG. 5 illustrates operation of a system that measures signal integrity cancellation effectiveness, generates a cancellation effectiveness vector, and uses a vector ascent mechanism to adjust the cancellation coefficients to maximize signal integrity cancellation effectiveness. As mentioned above, signal integrity cancellation effectiveness may be inversely related to signal integrity cancellation errors. Thus, in other embodiments, the system may measure signal integrity cancellation error, generate a signal integrity error vector, and use a vector descent mechanism to reduce (and ideally, minimize) the cancellation error to improve cancellation effectiveness.

Figure 6:
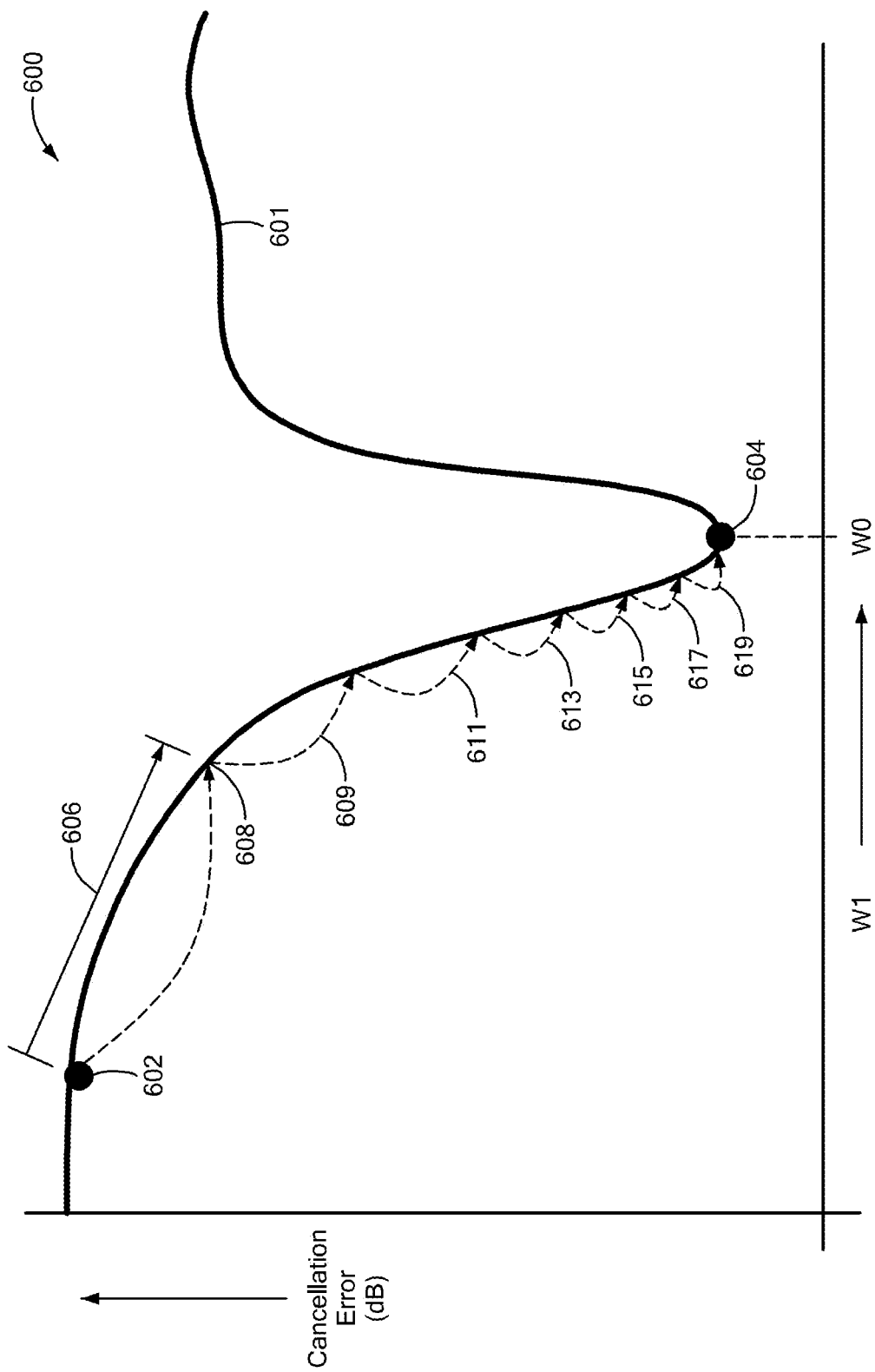
FIG. 6 is a graph of cancellation error versus a canceller coefficient.

Referring also to FIG. 6, graph 600 shows a cancellation error curve 601 that is the inverse of the cancellation effectiveness curve 501. As shown in graph 600, the cancellation error may have a minimum value at point 604, which may correspond to a cancellation coefficient value of $w_0$. When the SI canceller 106 begins operation, the system may not know where the minimum cancellation error value (i.e. point 604) lies along the cancellation error curve, so it may choose a starting position (e.g. starting value) at point 602. The starting position may be random or may be based on previous performance of the SI canceller. For example, the SI canceller may use a starting position that produced low cancellation error in previous cancellation operations or in similar operating environments.

To measure a vector that approximates a surface of a cancellation error surface (e.g. a surface if the form shown in FIG. 4) from which the cancellation error curve 601 is taken, the system may make two measurements along the curve. For example, to generate vector 606, the system may make a measurement of cancellation error at point 602, then change the value of the cancellation coefficient $w_I$ and make a second measurement of cancellation error at point 608. Once the two measurements are made, the system can generate a differential cancellation error vector 606 that approximates the cancellation error curve 601 between points 602 and 608.

The system may then adjust the value of the cancellation coefficient $w_I$ as indicated by reference numerals (609-619) by a step size (i.e. a step value or step factor) according to a modified gradient descent algorithm so that system performance approaches the point of minimum cancellation error value (i.e. point 604). The system may continue to iteratively measure cancellation and adjust the cancellation coefficient $w_I$ until the system reaches point 604 and/or reaches a maximum cancellation error threshold.

The step size for adjusting the cancellation coefficient $w_I$ may be defined as:

$$\mu_n(w, E_T) = \frac{E(w)}{E_T} + \frac{1}{n(|\nabla E(w)|^2)} \quad (4)$$

in which:
$\mu$ is the step size,
$E_T$ is an aggressiveness factor representing the target cancellation error value,
$E(w)$ is the cancellation error vector,
$\nabla E(w)$ is the cancellation error gradient, and
n is the tuning iteration number.
The variable w indicates that the various functions are functions of the canceller weights w. T is simply a subscript for identification purposes.

The factor $E_T$, which affects the first term of equation (4) may be considered an aggressiveness factor that defines how aggressively the system should approach the point of minimum cancellation error 604. The value $E_T$ may be set or tuned to reduce the number of iterations needed to achieve acceptable cancellation error. The value may be set prior to operation, during manufacturing, or may be tunable during operation. The first term of equation (3) is also based on the error vector itself so that, as the cancellation error of the system approaches a target (or threshold) error, the step size $\mu$ is iteratively reduced.

The second term of equation (3) includes the inverse of the gradient magnitude which is scaled by the forgetting factor n. In this example, n is the number of tuning iterations. When the gradient is small, the step size $\mu$ will be relatively large and, when the gradient is large, the step size $\mu$ will be relatively small. Thus, when the canceller weights w are on a flat portion of the cancellation effectiveness curve (i.e. when the gradient is small), the step factor $\mu$ will be relatively large so that the canceller weights change by a large step size to seek a global maximum. Conversely, when the canceller weights are on a sloped portion of the cancellation effectiveness curve (i.e. the gradient is large), the step factor $\mu$ will be relatively small so that the canceller weights can approach the global maximum without overstepping it. The forgetting factor further reduces the step size by scaling the gradient by the number of iterations n. Thus, as the number of iterations increases, the second term of equation (3) will iteratively be relatively reduced in magnitude so that, as the cancellation effectiveness of the system approaches a target effectiveness (e.g. point 504), the step size $\mu$ is also relatively reduced as can be seen in FIG. 5 by looking at points 502a-502f.

Figure 7:
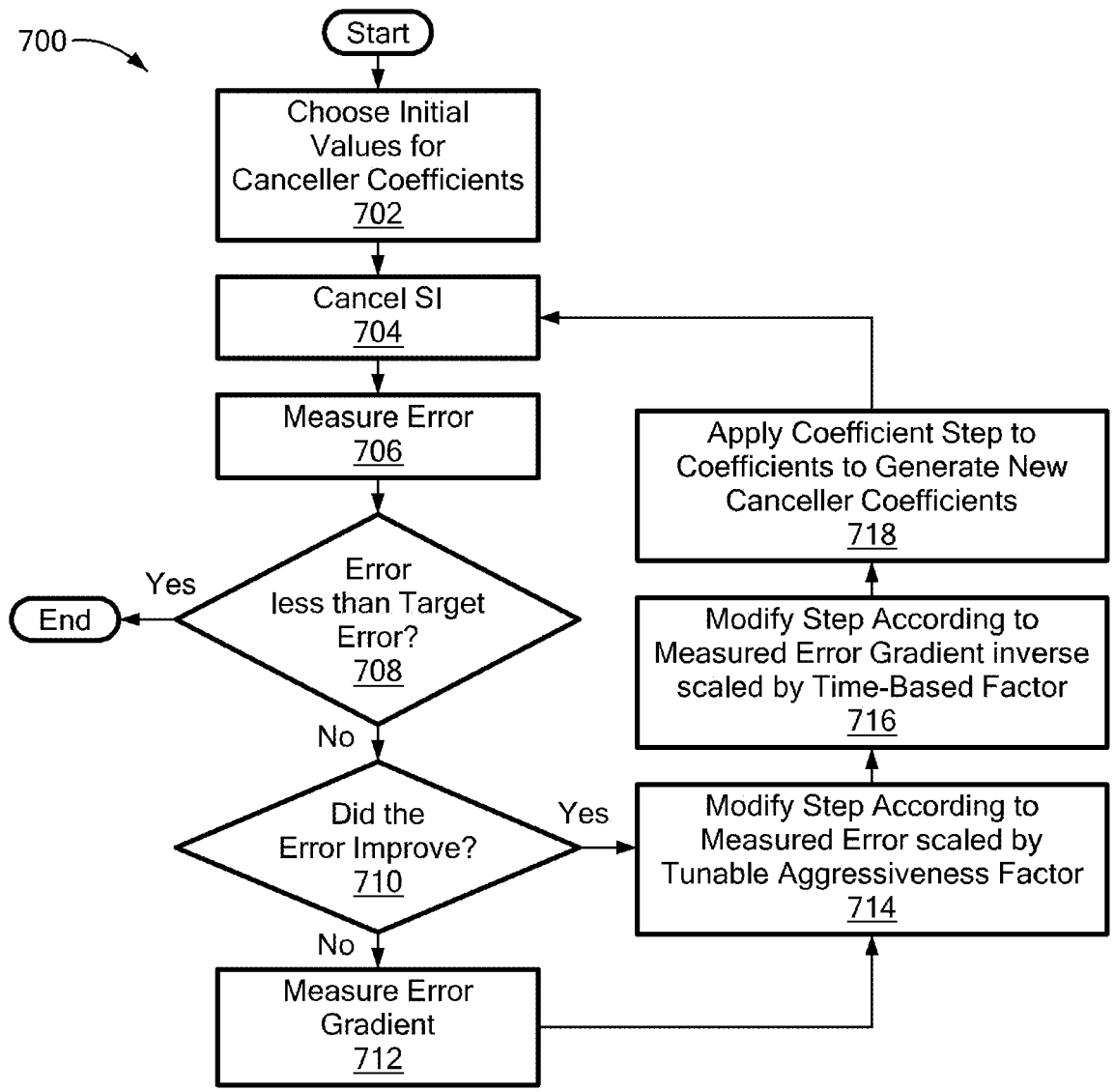
FIG. 7 is a flow chart of a process for generating SI canceller coefficients and tuning an SI canceller.

Referring to FIG. 7, a process 700 for tuning an SI canceller begins by determining (e.g. choosing, computing or otherwise determining) starting values for the SI canceller coefficients in box 702. The starting coefficients (e.g. coefficients $w_Q$ and $w_I$ mentioned above) may be randomly determined, determined based on experimental results, or determined based on past performance. Using the starting coefficients, the SI canceller 106 may cancel SI during transmission and reception of signals in box 704.

In box 706, the current cancellation error is measured. In box 706, the cancellation error is compared to a target cancellation error (e.g. a cancellation error threshold). If the measured error is less than a target error, no additional tuning is needed and the process ends. If the measured error is greater than the target error threshold, the process proceeds to box 710.

In box 710, the system determines whether the current error has improved. For instance, if the measured error decreased from a previous iteration, then the error improved. If the error improved, then the system proceeds to modify the step value by an aggressive factor in box 714. As discussed above, the step factor may be a value that is used to modify (i.e. to "step" or to change) the values of the canceller coefficients. If, in box 710, the error did not improve, then the system proceeds to measure the error gradient in box 712 before moving on to box 714. As mentioned above, the aggressiveness factor in box 714 may be a function of the error gradient itself. This allows the aggressiveness factor to reduce the size of the step factor as the cancellation performance approaches a target performance. For example, if the measured cancellation error is great, the aggressiveness factor will allow the step size to be relatively large. Conversely, as the measured cancellation error is reduced, the aggressiveness factor will allow the step size to be relatively smaller (e.g. as shown in FIGS. 5 and 6).

In box 718, the step factor is modified according to a time-based factor, for example the forgetting factor discussed above. The time-based factor may operate to reduce the size of the step over time and/or over the number of tuning iterations that have already occurred during the tuning process.

In box 718, the coefficients are modified by the calculated step factor. In other words, the value of the coefficients may be changed by the step amount. As noted above, the step may be a vector. Thus, the coefficients may be changed by the value of the step vector.

It is worthwhile to note that the aggressiveness factor can also affect the overall size of the step factor throughout all the tuning iterations. For example, by tuning the aggressiveness factor, it may cause the size of the step to be relatively large or relatively small for every tuning iteration. For example, for a given tuning process, a particular aggressiveness factor may cause each step in each tuning iteration to be large in comparison to like steps in a tuning process that has a different aggressiveness factor.

After applying the step to the coefficients in box 718, the system returns to box 704 where the SI canceller uses the newly modified coefficients to cancel SI during transmission and reception of signals. The system may continue to iterate through this (or a similar) process until the measured error is less than the error threshold. One skilled in the art will recognize that the process can be modified to measure cancellation effectiveness rather than cancellation error. In this case, the system will compare the current cancellation effectiveness against a cancellation effectiveness threshold and continue the process until the current, measured cancellation effectiveness exceeds the cancellation effectiveness threshold.

Figure 8:
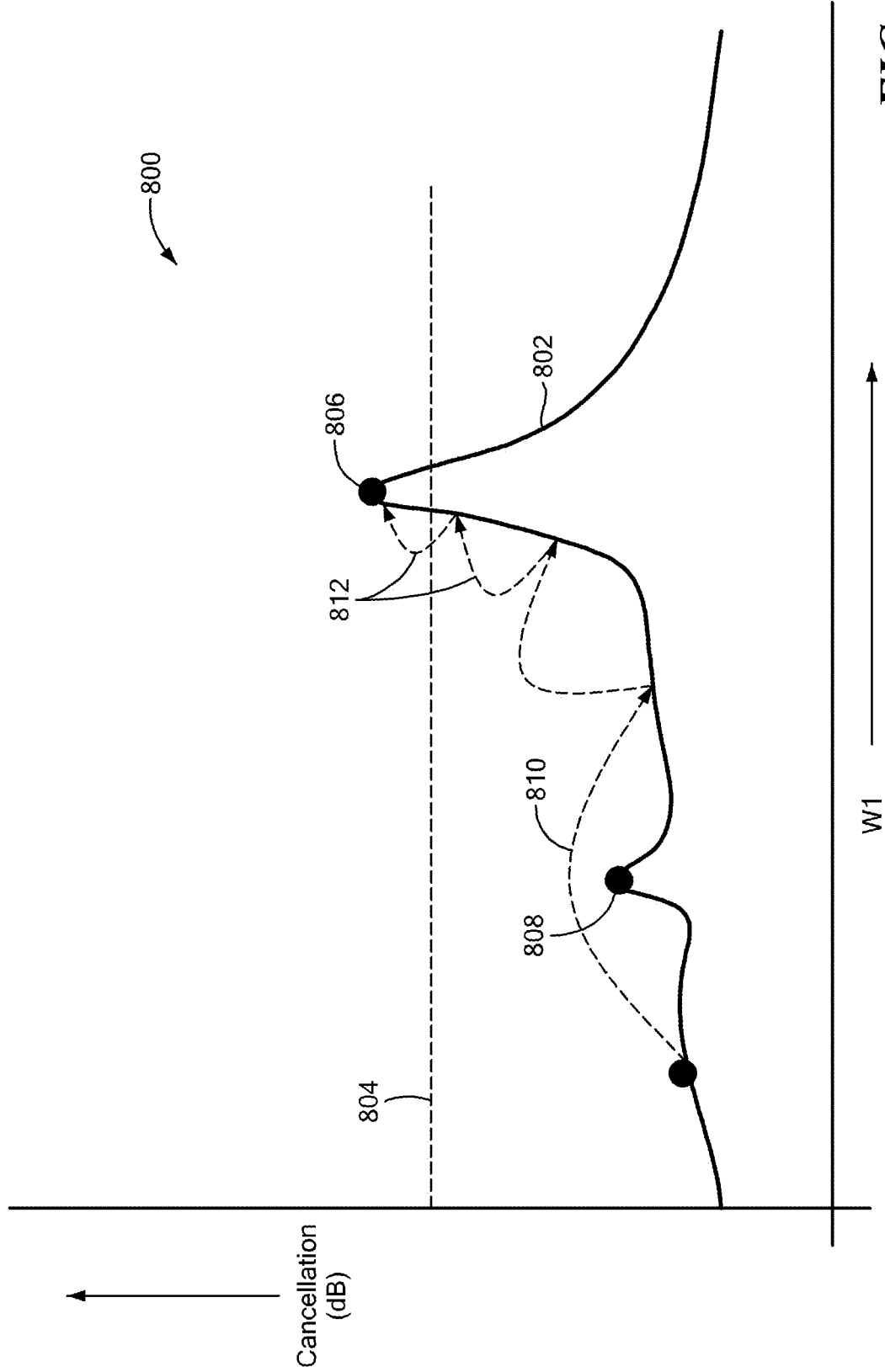
FIG. 8 is a graph of SI cancellation versus a canceller coefficient.

Referring to FIG. 8, a graph 800 of cancellation effectiveness is similar to graph 500. The horizontal axis represents the values of a canceller coefficient $w_I$ and the vertical axis represents cancellation effectiveness (this a fixed valve of Wq is assumed). Curve 802 is a cancellation curve may represent cancellation effectiveness for a particular embodiment and/or a particular environment in which the system is operating.

A predefined effectiveness threshold 804, defines a minimum effectiveness level for the system. In this example, the system will continue to modify the tuner coefficients (in this example, valves of coefficient We) at least until it finds coefficients that allow the system to operating with cancellation effectiveness above the threshold 804. In this example, the cancellation effectiveness curve 802 shows one maximum at point 808, which is below the minimum effectiveness threshold 804, and one maximum at point 806, which is above the maximum effectiveness threshold 804. In embodiments, the aggressiveness factor and/or the forgetting factor (discussed above) can be set so that the system tends to choose coefficient steps that "jump" over or bypass local maxima (such as point 808) that are below the minimum effectiveness threshold 804, as shown by dotted line 810. Then, the aggressiveness factor, effectiveness gradient, and forgetting factor may operate to reduce the step size so that the coefficients take smaller jumps (e.g. dotted line 812) as the coefficients approach a relative maximum effectiveness point 806 that is above the threshold 804.

Again, instead of measuring cancellation effectiveness, the system may operate by measuring cancellation error. In this case, the threshold 804 may be a maximum acceptable cancellation error threshold and the system may seek coefficients that operate at with a relative minimum cancellation error that is below the cancellation error threshold.

Figure 9:
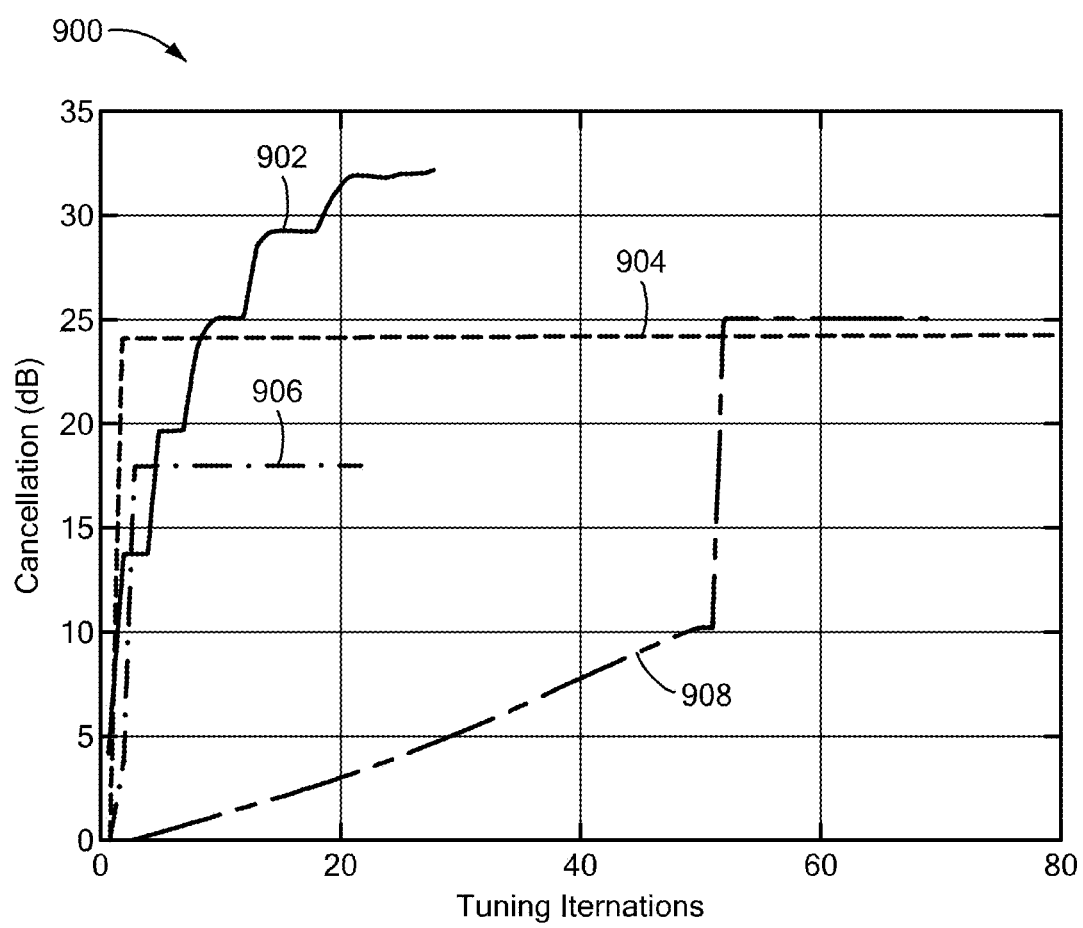
FIG. 9 is a graph of SI cancellation of various canceller systems vs. tuning iterations.

Referring to FIG. 9, graph 900 illustrates experimental results for SI canceller tuning effectiveness and speed in various systems. The horizontal axis represents the number of tuning iterations during SI canceler tuning and the vertical axis represents cancellation effectiveness in decibels. Curve 902 represents tuning effectiveness over time for an embodiment of the invention described in this patent. As shown, the effectiveness curve 902 for embodiments of the invention reach higher levels of effectiveness in fewer iterations than those of traditional systems 904. Curve 904 represents a momentum tuning algorithm, curve 906 represents an AdaGrad tuning algorithm and curve 908 represents a tuning algorithm that uses a precomputed step size that follows a natural logarithm function. These curves are included for comparison.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e. one, two, three, four, etc. The term "plurality" indicates any integer number greater than one. The term "connection" can include an indirect "connection" and a direct "connection".

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether or not explicitly described.

Relative or positional terms including, but not limited to, the terms "upper," "lower," "right," "left," "vertical," "horizontal," "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

The invention claimed is:

1. A method for canceling signal interference by a signal interference (SI) canceller, the method comprising:
    selecting an initial set of cancellation coefficients;
    applying the initial set of cancellation coefficients to the SI canceller;
    canceling signal interference with the SI canceller having the applied initial set of cancellation coefficients;
    measuring a cancellation error resulting from the initial cancellation coefficients;
    generating a cancellation error gradient from the measured cancellation error that defines a direction for tuning the cancellation coefficients to achieve a relative minimum cancellation error;
    changing the initial set of cancellation coefficients by a step factor to produce a first set of tuned cancellation coefficients, the step factor determined by a combination of the cancellation error and one or more of:
        the measured cancellation error scaled by a tunable coefficient step aggressiveness factor; and
        the cancellation error gradient scaled by a time-based forgetting factor;
    applying the first set of tuned cancellation coefficients to the canceller; and
    canceling signal interference in a transceiver by the canceller having the first set of tuned cancellation coefficients.

2. The method of claim 1 further comprising:
    (a) measuring a second cancellation error resulting from the first set of tuned cancellation coefficients;
    (b) changing the first set of cancellation coefficients by a second step factor to produce a second set of tuned cancellation coefficients, the second step factor based on:
        the second measured cancellation error;
        a tunable coefficient step aggressiveness factor; and
        a time-based forgetting factor; and
    (c) applying the second set of tuned cancellation coefficients to SI canceller; and
    (d) canceling signal interference with the SI canceller having applied the second set of tuned cancellation coefficients.

3. The method of claim 2 further comprising iteratively repeating steps (a)-(d) at least one additional time to progressively tune the cancellation coefficients and improve cancellation effectiveness.

4. The method of claim 1 wherein a direction of the step factor is determined by a direction of the cancellation error gradient.

5. The method of claim 1 wherein the SI canceller is an analog SI canceller.

6. The method of claim 1 wherein the signal interference is caused by a transceiver configured to concurrently transmit and receive signals within a single frequency band.

7. The method of claim 6 wherein the transceiver is a fifth generation (5G) or sixth generation (6G) wireless transceiver.

8. The method of claim 1 wherein the SI canceller has a plurality of taps and the set of cancellation coefficients contains one or more subsets of cancellation coefficients for respective ones of the plurality of taps.

9. The method of claim 1 wherein the aggressiveness defines a size of the step factor.

10. The method of claim 1 wherein the time-based forgetting factor functions to progressively reduce a size of the step factor based on a number of tuning iterations.

11. A system for canceling signal interference, the system comprising:
    a transceiver configured to concurrently transmit signals and receive signals within a single frequency band resulting in signal interference (SI);
    an SI canceller configured to use a set of cancellation coefficients to generate a cancellation signal to mitigate the SI between the transmitted signals and the received signals, the cancellation coefficients configured to at least partially define the cancellation signal;
    a processor configured to:
        change the cancellation coefficients by a step factor to produce tuned cancellation coefficients, the step factor determined by a cancellation error and one or more of:
            the cancellation error scaled by a tunable coefficient step aggressiveness factor; and
            a cancellation error gradient scaled by a time-based forgetting factor; and
        cause the SI canceller to cancel the SI using the tuned cancellation coefficients.

12. The system of claim 11 wherein the processor is further configured to progressively tune the cancellation coefficients to further improve cancellation effectiveness.

13. The system of claim 11 further comprising a cancellation error module coupled to receive the transmitted signals and use the transmitted and received signals to generate the cancellation error.

14. The system of claim 11 wherein a direction of the step factor is determined by a direction of the cancellation error gradient.

15. The system of claim 11 wherein the SI canceller is an analog SI canceller.

16. The system of claim 11 wherein the transceiver is an in-band full-duplex transceiver.

17. The system of claim 16 wherein the transceiver is a fifth generation (5G) or sixth generation (6G) wireless transceiver.

18. The system of claim 11 wherein the aggressiveness factor defines a size of the step factor.

19. The system of claim 11 wherein the time-based forgetting factor progressively reduces a size of the step factor based on a number of tuning iterations.

20. The system of claim 11 wherein the SI canceller is a multi-tap canceller and the cancellation coefficients include a set of cancellation coefficients for each tap of the canceller.

21. A system for canceling signal interference, the system comprising:
- a transceiver configured to concurrently transmit signals and receive signals within a single frequency band resulting in signal interference (SI);
- an SI canceller configured to use a set of cancellation coefficients to generate a cancellation signal to mitigate the SI between the transmitted signals and the received signals, the cancellation coefficients configured to at least partially define the cancellation signal; and
- means for progressively tuning the cancellation coefficients to produce tuned cancellation coefficients and applying the tuned cancellation coefficients to the SI canceller to allow the SI canceller to use the tuned cancellation coefficients to mitigate the SI and improve cancellation effectiveness.

\* \* \* \* \*